UNITED STATES PATENT OFFICE.

HANS KARPLUS, OF BERLIN, GERMANY.

PROCESS OF PRODUCING GRAPHITE IN COLLOIDAL FORM.

1,175,958.  Specification of Letters Patent.  Patented Mar. 21, 1916.

No Drawing.  Application filed June 26, 1915.  Serial No. 36,570.

*To all whom it may concern:*

Be it known that I, Dr. HANS KARPLUS, a citizen of Austria, residing at 36ᴬ Schöneberger Üfer, Berlin, in the German Empire, have invented new and useful Improvements in Processes of Producing Graphite in Colloidal Form, of which the following is a specification.

This invention relates to the production of graphite in colloidal form and has for its object to provide a process that is simple and yields good results.

It is known that certain kinds of those artificial graphites that are produced in the electric furnace may be deflocculated and converted into a colloidal soluble form through treatment with aqueous solutions of tannin or similar organic substances. However, when such a method is applied on other kinds of graphite, especially graphites as found in nature, a very small or no yield at all of colloidal graphite is obtained.

According to the present invention it is possible to split even native graphite into ultra-microscopical particles by subjecting the graphite to a stronger loosening process, viz. to peptonization. The bodies to be split up, on being peptonized are converted partly into compounds soluble in water, and partly into gaseous compounds. When the peptonizing agents are applied in comparatively small quantities, then only a fraction of the body to be disintegrated will dissolve or be transformed into a gas, while the main portion will remain behind undissolved but in a highly dispersed condition.

On treating ordinary graphite with strong oxidizing agents the process, under certain conditions, may be so conducted that only such oxidation products of the graphite are obtained that are soluble in water or are in the gaseous state. When graphite is mixed with concentrated sulfuric acid, and solid permanganate of potassium is added, the formation of graphitic acid, insoluble in water, starts even at ordinary temperature. However, if in such a case the process of oxidation is not carried on at ordinary temperature but is allowed to proceed to a higher temperature then, besides the graphitic acid, carbon monoxid and carbon dioxid and other oxidation products soluble in water are produced which are related to mellitic acid. The gaseous oxidation products and those that are soluble in water increase the higher the temperature is. If the graphite consists of approximately equally sized particles the formation of graphitic acid will be almost completely absent at a certain temperature in consequence of the fact that from this temperature upward the graphitic acid primarily formed is immediately further oxidized to oxidation products soluble in water. The same phenomenon appears on application of other oxidizing mixtures. If Brodie's oxidizing mixture

is used, the temperature above which the formation of graphitic acid is negligible is higher than if

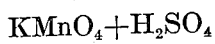

is used, and it is lower with

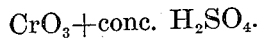

In any case the temperature above mentioned is lower the more finely crystallized the graphite used is, so that with graphites the grains of which have equal volume and are sufficiently fine the oxidation process may proceed at ordinary temperature without the danger of formation of graphitic acid.

The process according to this invention consists in allowing the said oxidizing mixtures to act upon the graphite to be split up at temperatures at which no perceptible formation of graphitic acid occurs, and in proportioning the oxidizing agent so that only a small quantity of the graphite is lost as gaseous oxids of carbon, or as oxidation products soluble in water. In most cases so small a proportion of the oxidizing agent suffices that at the utmost but 5 to 10 per cent. of the graphite acted upon could be oxidized to gaseous-oxids of carbon.

The process may be carried out either so that the graphite is mixed with the strong acids, and the oxidizing substance is added in solid form; or the oxidizing agents may with equal success be dissolved in the acid completely or partly whereafter the graphite is added in portions while the mixture is being stirred. The temperature at which the oxidation must proceed depends, as previously stated, upon the size of the particles of graphite used and will have to be determined by tests in each case. After the oxidation has sufficiently proceeded the graphite is separated by mechanical means. To facilitate the separation the mixture produced by the reaction is preferably diluted with water. A washing with water, preferably distilled water, follows, till the graphite can be so dispersed in distilled water as to produce a brown solution resembling a colloidal silver solution. The graphite thus obtained is free of oxidation products, especially free of graphiteic acid, if the peptonization is carried on at the proper temperature. A small sample brought to red heat neither shows development of gases or those inflation phenomena characteristic to the presence of graphitic acid. Should the dispersed graphite contain graphitic acid this may be decomposed by heating the graphite with concentrated sulfuric acid to from 160° to 180° centigrade in case the graphitic acid, if present, would be likely to interfere with the further use of the graphite.

As oxidizing agents solutions or mixtures of permanganates, for instance, permanganate of potassium, of chromic acid, chromates perchromates, chlorates, or perchlorates in $H_2SO_4$ or $HNO_3$ are suitable. Also mixtures of $PbO_2$ with $HNO_3$, and $MnO_2$ with $H_2SO_4$ or $HNO_3$ may be used.

The various oxidizing agents may be applied in mixture, or successively. Fuming nitric acid does not produce the desired dispersing action. To prevent a flocculating of the hydrosol through the action of electrolytes or carbonic acid of the air, the hydrosol produced may be stabilized in known manner by means of protecting colloids. For that purpose quite small proportions of gelatin, albumin, decomposition products of albumin, gum arabic, and the like may be dissolved in the hydrosol.

Since the native graphite of the trade, as a rule, can but partly be converted into a highly dispersed form by the peptonization process, it is necessary to separate the highly dispersed constituents from those that are not sufficiently split up.

For obtaining the highly dispersed graphite constituents it is necessary to apply a fractionating elutriation which can be carried on in pure water. Preferably the elutriation is carried on in aqueous solutions of organic compounds capable of affecting the capillary action of the solvent as for example nonelectrolytes such as the dryrophilous colloids albumin, peptone, gelatin, tragacanth, agar, gum, glue, saponin, cyclamin amygdalin, and the like, which reduce the surface tension of the solvent. Non-colloidal substances, too, may be used, as for instance amyl alcohols. As against an elutriation in pure water, an elutriation carried on in such solutions as specified above allows of a more distinct fractionation with regard to the size of the particles. Those constituents that remain in suspension after the mechanical deposition process, may be separated in any known manner, for instance by a filtering or centrifugal action, which, if desired, may be preceded by a coagulation of the mass through the action of an electrolyte.

The product obtained by the process is primarily intended to be used as a lubricant.

Example: 1 kilogram of native graphite having been rid of its ash constituents in any known manner, is mixed with 3 kilograms of concentrated sulfuric acid. While the mixture is being stirred 150 grams of permanganate of potassium, or 200 grams of sodium dichromate, or an equivalent mixture of both of these substances, are added in the solid state. After a few days about 300 grams of water are added, which addition has been found of advantage but is not a requisite. Thereupon a further quantity of 150 grams of permanganate of potassium, or 200 grams of dichromate, are added. The single operations may be carried out also at the same time. The oxidation being sufficiently advanced, which may be ascertained by testing the hydrosol, the entire mass is poured into 10 liters of water. Thereafter the graphite is drawn off and washed with distilled water. To separate those non-colloidal constituents which may still be contained in the graphite, the peptonized graphite is then thoroughly disseminated in a solution of 50 grams saponin in about 10 liters of water. Finally, the whole mass is subjected to a mechanical deposition process. The hydrosol obtained is separated from the sediment in well known manner.

What I claim is:

1. The process of producing graphite in colloidal form, consisting in peptonizing graphite with strong oxidizing agents and thereafter washing the products of the reaction.

2. The process of producing graphite in colloidal form, consisting in subjecting graphite to the peptonizing action of strong oxidizing agents at a temperature at which the formation of graphitic acid is substantially absent, which temperature is previously determined for the particular size of granules by tests, and thereafter washing the products of the reaction.

3. The process of producing graphite in colloidal form, consisting in subjecting graphite to the peptonizing action of strong oxidizing agents thereafter washing the products of the reaction and finally separating the highly dispersed constituents from the less highly dispersed particles by an elutriation treatment.

4. The process of producing graphite in colloidal form, consisting in peptonizing graphite with strong oxidizing agents at a temperature at which the formation of graphitic acid is substantially absent, which temperature is previously determined for the particular size of granules by tests, thereafter washing the products of the reaction, and finally separating the highly dispersed constituents from the less highly dispersed particles by an elutriation treatment.

5. The process of producing graphite in colloidal form consisting in peptonizing graphite with strong oxidizing agents, thereafter washing the products of the reaction and finally separating the highly dispersed constituents from the less highly dispersed particles by an elutriation in an aqueous solution of organic non-electrolytes capable of decreasing the surface tension of the water.

6. The process of producing graphite in colloidal form consisting in peptonizing graphite with strong oxidizing agents at a temperature at which the formation of graphitic acid is substantially absent, which temperature is previously determined for the particular size of granules by tests, thereafter washing the products of the reaction and finally separating the highly dispersed constituents from the less highly dispersed particles by elutriation in an aqueous solution of organic non-electrolytes capable of decreasing the surface tension of the water.

7. The process of producing graphite in colloidal form consisting in peptonizing graphite with strong oxidizing agents, thereafter washing the products of the reaction and finally separating the highly dispersed constituents from the less highly dispersed particles by an elutriation in an aqueous solution of organic non-electrolytes, which are hydrophilous colloids and capable of decreasing the surface tension of the water.

8. The process of producing graphite in colloidal form consisting in peptonizing graphite with strong oxidizing agents at a temperature at which the formation of graphitic acid is substantially absent, which temperature is previously determined for the particular size of granules by tests, thereafter washing the products of the reaction and finally separating the highly dispersed constituents from the less highly dispersed particles by elutriation in an aqueous solution of organic non-electrolytes, which are hydrophilous colloids and capable of decreasing the surface tension of the water.

In witness whereof I have signed my name in the presence of two subscribing witnesses.

Dr. HANS KARPLUS.

Witnesses:
 WOLDEMAR HAUPT,
 HENRY HASPER.